US006515939B1

(12) United States Patent
Green et al.

(10) Patent No.: US 6,515,939 B1
(45) Date of Patent: Feb. 4, 2003

(54) PULSE SAMPLED OPTICAL FIBER HYDROPHONE ARRAY (U)

(75) Inventors: Eugene L. Green, New London, CT (US); Gerald E. Holmberg, Quaker Hill, CT (US); Jeffrey C. Gremillion, Voluntown, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/795,843

(22) Filed: Sep. 4, 1985

(51) Int. Cl.$^7$ ................................................. H04R 1/44
(52) U.S. Cl. ..................................................... 367/149
(58) Field of Search ................................. 367/140, 149; 385/12, 13; 250/227.11, 227.14

(56) References Cited

U.S. PATENT DOCUMENTS

| | | | | |
|---|---|---|---|---|
| 4,310,905 A | * | 1/1982 | Palmer | 367/140 |
| 4,375,680 A | * | 3/1983 | Cahill et al. | 367/149 |
| 4,525,818 A | * | 7/1985 | Cielo et al. | 367/149 |
| 4,545,253 A | * | 10/1985 | Avicola | 367/140 |

OTHER PUBLICATIONS

Lagakos et al., Microbend Fiber–Optic Sensor as Extended Hydrophone, Oct. 1982, pp. 1633–1636.*
Green et al., Passive Demodulation of Optical Interferometric Sensors, Oct. 1982, pp. 1639–1644.*
Dandridge et al., Homodyne Demodulation Scheme for Fiber Optic Sensors Using Phase Generated Carrier, Oct. 1982, pp. 1647–1653.*

* cited by examiner

Primary Examiner—Daniel T. Pihulic

(74) Attorney, Agent, or Firm—Michael J. McGowan; Michael F. Oglo; Prithvi C. Lall

(57) ABSTRACT

An array through a first to a second side of a three-sided junction, accessed remotely by a single mode fiber transmits a light pulse sequence to the array and receives sound modulated return light signals via the second to a third side of the junction. Within each hydrophone, butt coupled fiber joints form a continuous structure, encapsulated within a compressible plastic tube for mechanical stability. Tube volume expands and contracts linearly with variations in acoustic pressure thereby proportionally modulating the optical path therethrough. Each joint is a partial reflector reflects part of the incident light beam back via the second to third side of the junction to a posthydrophone compensating interferometer which compensates for path difference between equally spaced array joints; From the third side of the junction the reflections from the butt coupled fiber joints pass through a light detector and signal processor. Interference is produced between reflected light beams from successive joint pairs, from which phase modulation due to each hydrophone may be obtained. The partially reflecting joints thus permit serial sampling of the phase modulation of light as a function of position. Light reflected from the fiber lead/array joint provides a signal that is proportional to light source intensity variations and perturbation effects of the lead which may be cancelled. Since the lead is a propagating medium for phase modulated light beams from all joints, lead-induced phase noise is not present. Since path differences between interferring beams is matched precisely by the compensating interferometer, light source phase noise is cancelled. In an important variation of the invention the compensating interferometer is located in the fiber through which the array is accessed, ahead of the three-sided optical junction. Pursuant to this variation of invention the parts of the incident light beam that are similarly reflected back from the joints and pass from the second to third sides of the junction, but there is no compensating interferometer in the path from the third side of the junction to the light detector and a signal processor.

16 Claims, 7 Drawing Sheets

PULSE SAMPLED OPTICAL FIBER HYDROPHONE ARRAY (U)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an optical sensor system and more particularly to an electrically passive, remote hydrophone arrangement which produces stable acoustic signals using only inboard electronic signal processing.

(2) Description of the Prior Art

Early optical fiber type arrays using all-optical hydrophones and optical leads such as U.S. Pat. No. 4,115,753 did not provide for suppression of the phase and intensity noise introduced into the outboard leads. More recently, electrically passive all-optical hydrophones have been described in co-pending patent application Ser. No. 274,034. These hydrophones utilize laser frequency tuning to facilitate feedback stabilization of discrete two-beam interferometric sensors. Further, co-pending patent application Ser. No. 537,752 described parallel operation of several such sensors energized by one stable light source utilizing laser frequency modulation by a periodic signal in conjunction with a signal demodulation technique that removes low frequency phase noise from the signal. This concept also appears in, IEEE Journal of Quantum Electronics, QE-18, pp. 1639–1644, 1982. An alternative technique for demodulation was described by A. Dandridge, et al., IEEE Journal of Quantum Electronics, QE-18, 1647–1653, 1982. The Dandridge et al technique of phase modulation within a two beam interferometer by means of a piezoelectric device is inconsistent however with electrically passive outboard operation of that sensor. Such piezoelectric phase modulation allows matching of the lengths of the two paths of the interferometer so that the interferometer then becomes insensitive to the phase noise of the laser in the frequency band of the acoustic signal. Lagakos et al, in IEEE Journal of Quantum Electronics, QE-18, 1633–1638, 1982, describes extended microbend, intensity type hydrophones operated by transmission of light through multimode fibers. These sensors, while electrically passive, require a pair of parallel leads for each hydrophone. Although multimode fiber leads are believed to be robust versus mechanically excited noise as compared to single mode fibers, they do not provide inherent immunity to such noise in the sensor technique taught by Lagakos et al.

SUMMARY OF THE INVENTION

Accordingly, it is a general purpose and object of the present invention to provide an electrically passive, remote, single outboard lead optical hydrophone array, wherein, the elements of the array are arranged in a serial and/or a parallel configuration. It is a further object to show that stable acoustic signals may be derived from interferometric optical hydrophones, i.e., phase sensors, without the need for matching outboard acoustically isolated reference paths. A still further object is that the invention derives stable acoustic signals by totally inboard optical and electronic processing from an array of phase sensors and from an array of intensity (microbend) sensors.

These objects ate accomplished with the present invention by providing an optical waveguide hydrophone array, accessed remotely by a single mode fibers which transmits a light pulse sequence to the array and receives sound modulated return light signals. Within each phase hydrophone array, butt coupled fibers form a continuous structure, encapsulated within a compressible plastic tube. Tube volume expands and contracts linearly with variations in acoustic pressure, thereby proportionally modulating the optical path therethrough. Each joint, that couples hydrophones reflects part of the incident light beam back via the fiber lead to an interferometer, which compensates for path differences between equally spaced array joints. The recombined beam passes through a light detectors and a signal processor. Interference is produced between reflected light beams from successive joint pairs, from which phase modulation due to each hydrophone may be obtained. The partially reflecting joints thus permit sampling of the phase modulation of light as a function of position. Light reflected from the fiber lead/array joint provides a signal that is proportional to light source intensity variations and perturbation effects experienced by the lead. This intensity noise therefore may be cancelled. Since the fiber lead provides a common conductor for phase modulated light beams from all joints, lead induced phase noise is not present in the signal. Also, since path differences between interferring beams are matched precisely by a compensating interferometer, light source phase noise is cancelled.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
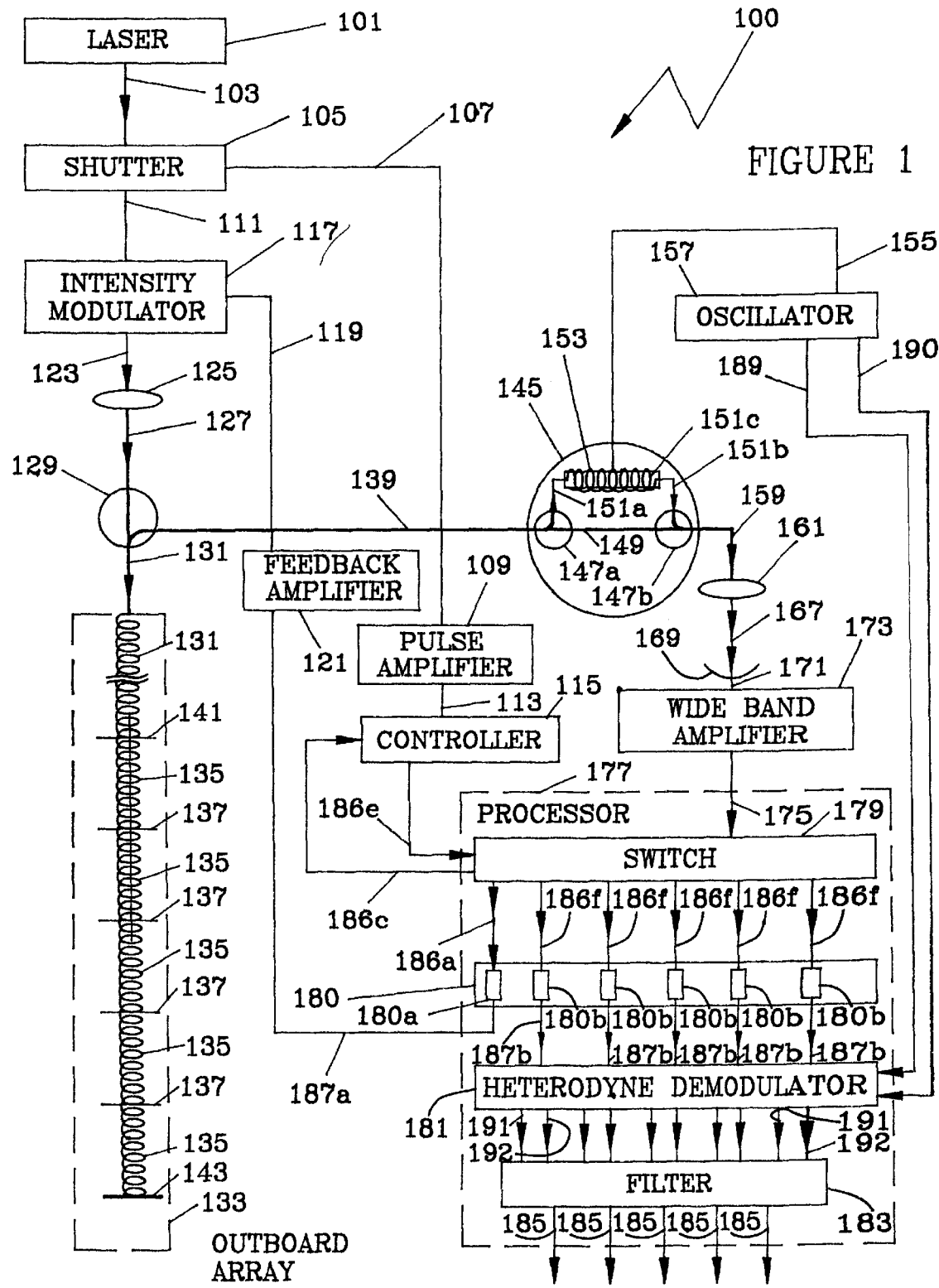
FIG. 1 shows a block diagram of a pulse sampled optical fiber hydrophone array of the present invention using phase sensors.
Figure 3:
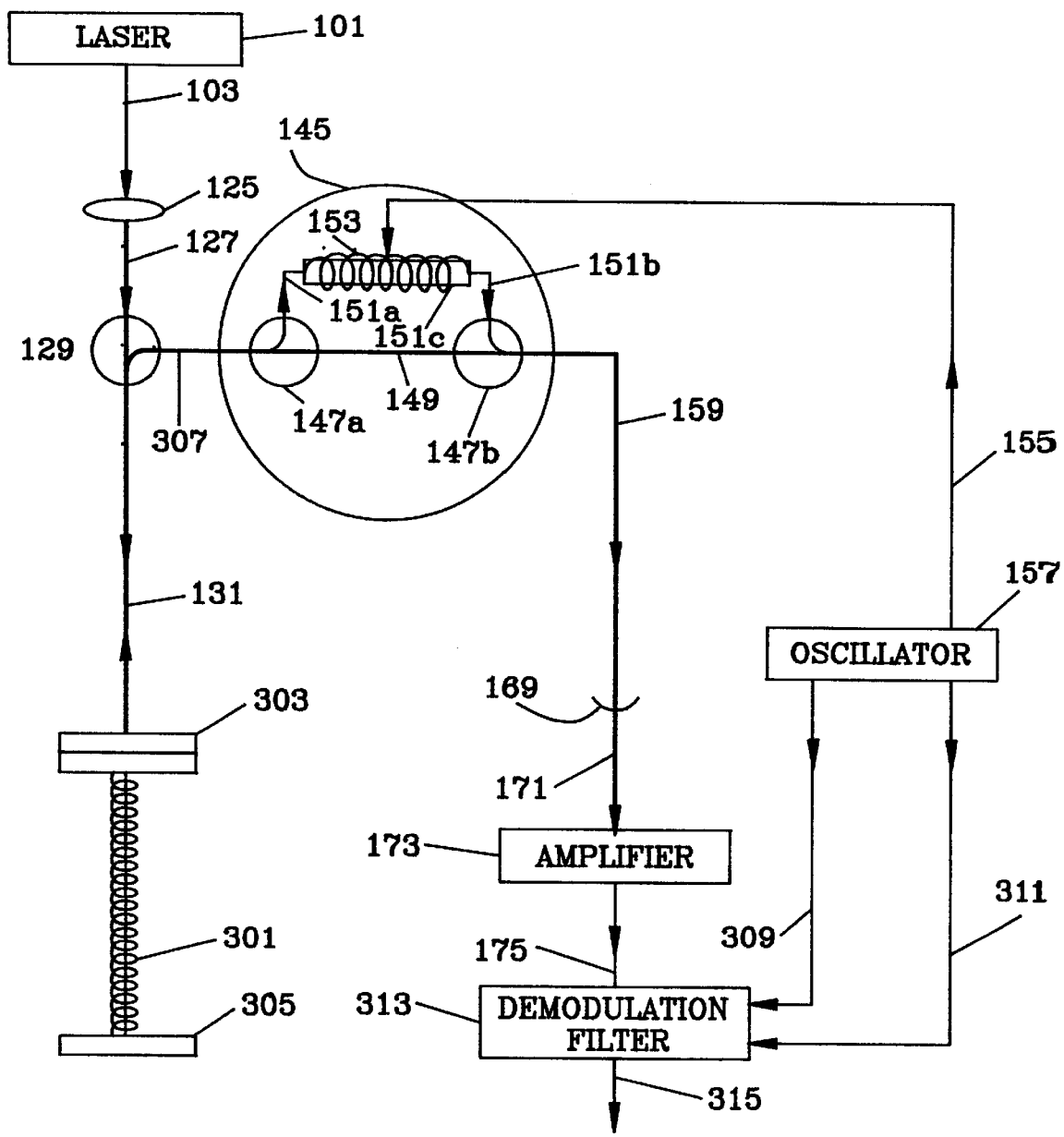
FIG. 3 shows a simplified embodiment of the invention using a single phase sensor.

Referring now to FIG. 1 there is shown a system 100 built according to the present invention. System 100 comprises an array of fiber hydrophone phase sensors that are serially accessed by pulsed light. These phase sensors are optical hydrophones that incorporate dielectric waveguides, within which optical path length is modulated by sound. This single mode fiber array is accessed remotely by means of a single mode fiber lead, which transmits a predetermined temporal and spacials sequence of pulses of light to the array and returns light pulses that have been modulated by sound. The single mode fibers contained within the hydrophones are tightly butt coupled to yield one mechanically continuous fiber. The junctions between array hydrophones may be encapsulated in plastic, e.g., epoxy, to provide the requisite mechanical stability. At each junction or interface between the fibers within the array, part of the incident light, now phase modulated, is reflected back via the fiber array and the fiber lead to an interferometer. The interferometer compensates for the path difference between the equally spaced interfaces of the array. The combined light beam is then transmitted to a light detector and a signal processor. Interference is obtained between light beams reflected back from successive pairs of butt joint junctions between the fiber hydrophones, from which the phase modulation produced by sound within each hydrophone is derived. The partially reflecting butt joints thus permit sampling of the phase modulation of light as a function of position. The fibers which as shown in FIGS. 1 and 3 are helically configured, are encapsulated within a continuous compressible tube or cladding, the volume of which varies linearly with acoustic pressure. The expansion and contraction of this encapsulating medium, which may be a plastic that approximately matches the acoustic impedance of water, causes proportional modulation of the optical path length of the fibers. The light that is reflected from the initital interface between the fiber lead and the array provides a signal that is proportional to any intensity modulation of light associated with the light source and/or perturbations of the lead. This intensity noise, which multiplies the signal from the array, may therefore be cancelled. Since the single fiber lead provides a common conductor for phase modulated light beams from all joint interfaces, phase noise cannot be caused by the lead. Since the path difference between two interfering beams is matched precisely by means of a compensating interferometer any phase noise attributable to the light source is also cancelled.

As used herein, electrically passive means that powered electronic components are absent from the array, and that only light is transmitted to and returned from an array of optical sensors. By stable operation is meant that the output of the inboard signal processor is free from phase and intensity noise associated with the light source, or induced by mechanical vibration or other ambient perturbations of the fiber lead.

Serial and/or parallel arrangements of one or more sensors may be interrogated using the compensator technique of the present invention. A serial arrangement is achieved by transmitting a sequence of short pulses, which are reflected back from interfaces between elements (hydrophones) of the array. The serial arrangement, utilized in conjunction with all inboard signal processing, eliminates the need for an outboard reference path in the case of the phase sensor. For both phase and intensity type sensors, the single optical fiber lead replaces the many leads presently required in the parallel sensor configuration. As a result of a serial arrangement, complexity and cost of the outboard array is greatly reduced, and reliability is enhanced.

FIG. 1 shows the basic method of operation of a pulse sampled fiber optic hydrophone array system 100 comprising a plurality of serial phase sensors. Five sensors are shown in this example. Laser 101 generates light beam 103, which is modulated by shutter 105, which in turn is driven by voltage output 107 from pulse amplifier 109. Shutter 105 may be an external light intensity modulator, or may be integral with the laser 101. Pulse modulated light beam 111, which exits shutter 105, comprises light pulses of width, δt, where δt is approximately equal to the time interval, nl/c, required for propagation of light between any two partially reflecting interfaces 137. As used herein "n" is the effective index of refraction of a fiber, l is its length, and c is the velocity of light. The input to pulse amplifier 109 is a sequence of trigger pulses 113 from clock 115. The time interval between trigger pulses is $T_o$ seconds, or the pulse rate is $1/T_o$ pulses per second. $T_o > 2[\Delta T + \delta t]$ where $\Delta T$ is the time interval required for propagation of light in the array from initial junction 141 to terminating reflector 143, and δt is the pulse width or time required for the pulse to enter the array. The pulsed laser 101 is intensity stabilized by intensity modulator 117, which varies the intensity of light beam 111 linearity with voltage output 119 of feedback amplifier 121. Light beam 123 from intensity modulator 117 is focused by lens 125 onto fiber 127, and at three-sided optical junction 129 enters fiber lead 131, which transmits the light to array 133. Array 133 comprise a plurality of fiber hydrophones 135, which are acted upon by sound so as to modulate the phase of the light pulse. At the butt junctions or interfaces 137 between the fiber hydrophones 135, a predetermined fraction of the incident light is reflected and returned through array 133, lead 131, junction 129 and fiber 139 to post hydrophone compensating interferometer 145 stated another way, the junctions (including initial junction 141) effectively constitute partial reflectors interposed in the optical path of the laser beam. The reflectance of each interface 137 within array 133 is determined by the index of refraction of a dielectric layer, which may be a coating deposited upon either of the fibers that come together at the interface joint. The reflectances of interfaces 137 are adjusted such that the light intensity reflected back through the array, and through initial junction 141 to the fiber lead, and thence to junction 129, is approximately equal for all interfaces 137 of array 133. From junction 129 the reflected light pulses travel via fiber 139 to entrance junction 147a of compensating interferometer 145. Interferometer 145 comprises short fiber path 149 ($L_1$), and long path, $L_2$, further comprising fiber 151a and its continuation, fiber 151b. The propagation time difference between paths $L_2$ and $L_1$ exactly equals the time delay introduced within array 133 between light beams reflected from two adjacent interfaces 137; that is:

$$\frac{L_2 - L_1}{c} = \frac{2nl}{c}$$

Therefore, each light pulse reaching exit junction 147b of interferometer 145 will be a highly coherent superposition of reflections from pairs of interfaces 137. Since compensating interferometer 145 is isolated from sound and vibration, the difference between any adjacent pair of reflected beams will be attributable to modulation by sound of a fiber hydrophone 135. Low frequency, out-of-band relative phase modulation can be removed by signal processing that is well understood for discrete optical interferometric hydrophones. Long path $L_2$ also includes phase modulator 153 comprising a piezoelectric cylinder, upon which is wrapped fiber portion 151c and to which a modulating signal 155, such as a sinusoid, proportional to $\sin \omega_r t$, from oscillator 157, is applied to modulate the diameter of phase modulator 153 and therefore the length of fiber 151c. Light beams from the long path, $L_2$ and the short path, $L_1$, are combined in exit junction 147b and transmitted into fiber 159, which is projected by lens 161, as beam 167 onto a light-signal-to-electrical-signal detection stage in the form of a light detector 169. The current 171 from light detector 169 is amplified by wideband amplifier 173. This amplifier must resolve to a sequence of pulse samples separated by the time interval between successive reflecting interfaces 137 of array 133. This received pulse rate, $f_s$, is given by:

$$f_s = c/2n1$$

The output 175 from amplifier 173 is inputed to processor 177. Processor 177 includes switch 179, memory 180, heterodyne demodulator 181, and filter 183 which removes out-of-band phase modulations. The outputs from processor 177 are discrete parallel acoustic signals 185, one for each fiber hydrophone 135. Timing information of the received pulse train is fed back from switch 179 via 186c to controller 115 which generates signal 186e to cause switch 179 to direct input 175 as outputs 186f to a sequence of bins 180b associated with hydrophones 135. For example, the first pulse from initial junction 141 of array 133, from switch 179 via 186c initiates a sequence of equally spaced pulses 186e from controller 115 to switch 179 causing switch 179 to direct input 175, as outputs of 186f to a sequence of bins 180b associated with hydrophones 135. The switching rate is equal to pulse rate $f_s$. Switch 179 addresses each bin for a time interval δt equal to the transmitted pulse width. Bin 180a integrates the first pulse received from initial junction 141 of array 133 via 186a in bandwidth B. The output 187a of bin 180a enters feedback amplifier 121 and produces inverted output 119 which operates intensity modulator 117 to stabilize light beam 111. Bins 180b integrate sequential pulses received from hydrophones 135, i.e., from adjacent pairs of interfaces 137 and including terminating junction 143. These integrations are also performed in bandwidth, B, which is greater than frequency $2f_r$ plus sidebands at acoustic frequencies commensurate with a hydrophone, where $$f_r = \frac{\omega_r}{2\pi}.$$

Oscillator 157 outputs reference signal 189 proportional to sin $\omega_r t$ and signal 190 proportional to cos$2\omega_r t$ to heterodyne demodulator 181. Memory 180 outputs integrated signals 187b from bins 180b to heterodyne demodulator 181. Demodulator 181 outputs two signals, 191 and 192, for each channel of input 187b; each of these signals being associated with a unique hydrophone. These signals are cos $\psi_i$ and sin $\psi_i$, where i=1,2,3, ... denotes a particular hydrophone, and $\psi_i(t)$ is the total phase modulation pertaining to each hydrophone 135, including low frequency out-of-band as well as in-band acoustic signal components. Signals 191 and 192 are then operated upon by filter 13 to yield in-band acoustic signals 185, one for each hydrophone. One method of operation of each channel of demodulator 181 and filter 183 was fully described previously in co-pending patent application Ser. No. 537,752. Alternatively the channels may operate according to the technique taught by Dandridge et al.

Figure 2:
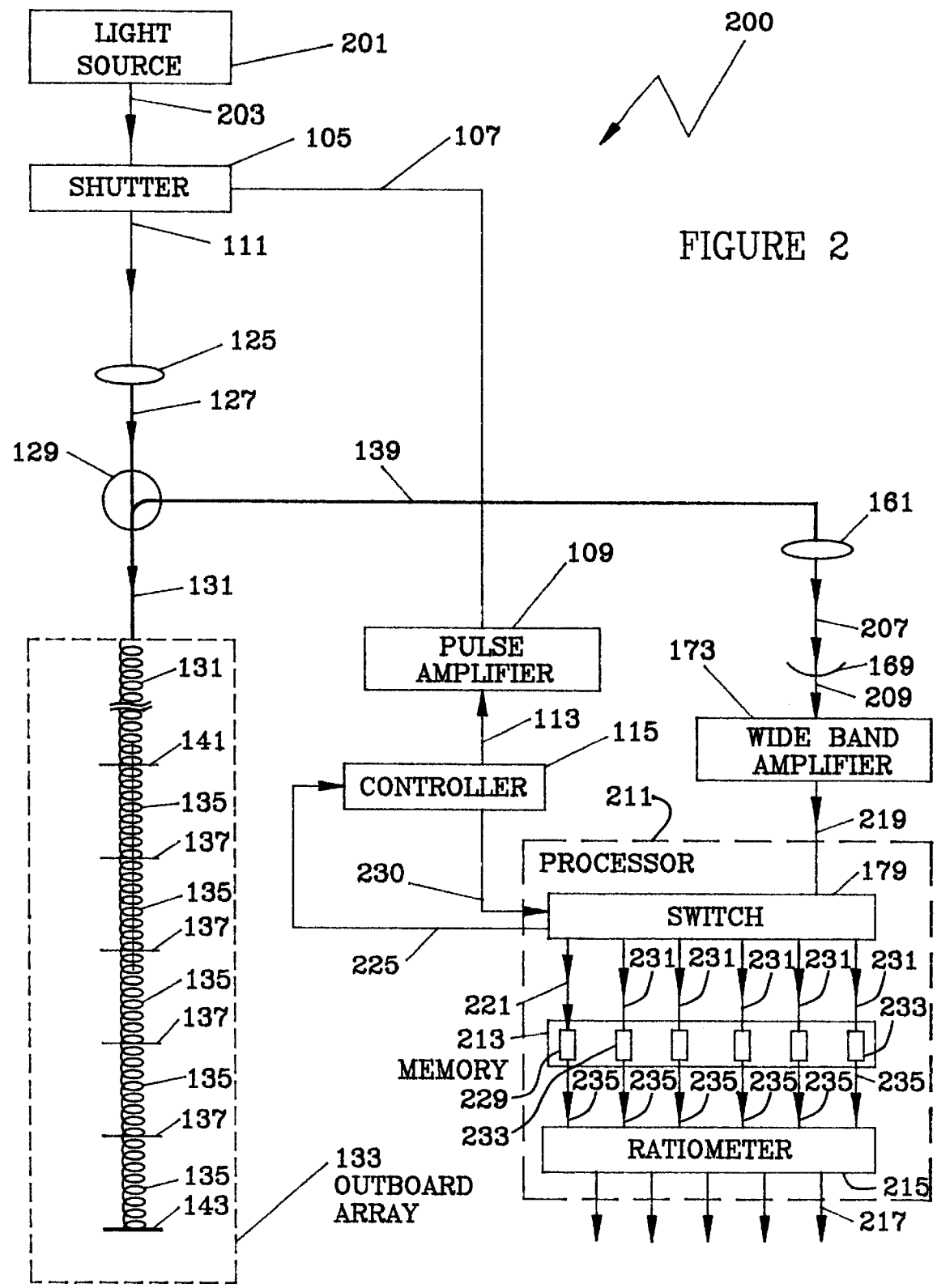
FIG. 2 shows an alternate embodiment of the system of FIG. 1 using intensity sensors.

FIG. 2 shows an alternate embodiment of the present invention further comprising an array of intensity sensors that are serially accessed by pulsed light. These hydrophones modulate the intensity rather than the phase of light. The preferred modulation means is a loss mechanism, specifically microbending of a fiber, which transfers light power from core to cladding in proportion to instantaneous sound pressure. Light is lost from the cladding, either through radiation or by means of an absorbing coating applied to the fiber. The basic principle of operation of an optical hydrophone based on microbending has been described by Lagakos et al. The fiber is wound on a grooved mandrel with a rubber sleeve applied to distribute the external pressure. The use of single mode fiber in a microbending device, rather than multimode fiber, also prevents signal degradation by random mode coupling, i.e., modal noise.

FIG. 2 shows a pulse sampled fiber hydrophone array system 200 having intensity modulation type sensors. Light source 201 produces light beam 203, which is modulated by shutter 105, driven by voltage output 107 of pulse amplifier 109. Light source 201 may be either a laser or a high power superradiance diode. Shutter 105 is an external light intensity modulator. Alternatively the light source may be pulsed directly by modulating its power supply. Pulse modulated beam 111, which exits shutter 105, comprises light pulses of width, δt, where δt, is equal approximately to the time interval, n1/c, required for propagation of light between any two partially reflecting interfaces 137, which are the boundaries of a microbend hydrophone 135 of outboard array 133. Mutual coherence between successive pulses of light is assumed to be very small. The input to the pulse amplifier 109 is a sequence of trigger pulses 113 from clock 115 at a pulse rate of $1/T_o$ pulses per second. Light beam 111 is focused by lens 125 onto fiber 127, the resultant beam passing through junction 129 into fiber lead 131, which transmits the light beam to array 133. Array 133 comprises fiber hydrophones 135, which are acted upon by sound to modulate microbending loss and therefore intensity. Reflectance at the butt junctions or interfaces 137 between the fibers is determined by the index of refraction of a dielectric layer, which may be a coating deposited upon either of the fibers that come together at an interface 137. Dielectric or metal gratings as described in FIG. 1 may also be used. Reflectance at an interface 137 increases with distance along array 133 from the initial junction 141, where fiber lead 131 couples to array 133. Reflectances are selected so that light intensity reflected back through array 133 and initial junction 141 to fiber lead 131, and thence to junction 129 will be approximately the same for all interfaces 137 within the array. From junction 129 the reflected light pulses travel via fiber 139 to lens 161, where they are projected as beam 207 onto light detector 169. The current 209 from light detector 169 is amplified by wide band amplifier 173, the output of which inputs processor 211. Processor 211 includes switch 179, memory 213, and ratiometer 215. The outputs from processors 211 are discrete parallel signals 217, each of which relates to one of the fiber hydrophones 135. Timing information of the received pulse train is fed back from switch 179 via 221 to controller 115 which generates signal 230 to cause switch 179 to direct input 219 as outputs 231 to a sequence of bins 233 of memory 213. For example, the first pulse from initial junction 141 of array 133, from switch 179 via 221 initiates a sequence of equally spaced pulses 230 from controller 115 to switch 179 causing switch 179 to direct input 219 as outputs 231 to a sequence of bins 233 of memory 213. Memory 213 integrates in a bandwidth, B', which is greater than the maximum acoustic signal frequency from a hydrophone 135. The outputs of memory 213 are signals 235 which are the inputs to ratiometer 215. Ratiometer 215 computes ratios of temporarily adjacent inputs 235. The outputs of ratiometer 215, therefore, are discrete signals 217, which are related to the corresponding hydrophone 135 of array 133. These outputs 217 are independent of intensity fluctuations associated with perturbations of the light source and the fiber lead.

FIG. 3 shows the basic method of operation of a remote passive phase sensor according to the present invention. Laser 101 generates light beam 103, which contains a broad optical spectrum. The temporal coherence of the light source is limited by the constraint given by equation below. Light beam 103 is focused by lens 125 onto fiber 127, and at junction 129 enters fiber lead 131, which transmits the light to phase sensor 301. Phase sensor 301, is preferably an optical fiber, either coated with or imbedded in a plastic material, which enhances its sensitivity to sound.

Phase sensor 301 is joined to fiber lead 131 by means of butt-junction 303, which is partially reflecting. Partial reflectance may be achieved efficiently by depositing either a thin metallic or a dielectric coating, the index of refraction of which differs from that of the glass, on the polished end of one of the fibers. Sensor 301 is terminated by reflector 305, which may be a full reflector. It is required that the magnitude of the degree of coherence between light beams reflected respectively from junction 303, and from reflector 305 be low. If $\lambda$ is the mean wavelength of the light source, and $\Delta\lambda$ is its linewidth, with a Gaussian intensity spectrum; then $$\lambda^2/\Delta\lambda < 2nl$$

Where 1 is the length of the phase sensor 301 and n is the refractive index of the sensor medium. The reflectance at butt-junction 303 is determined by the condition that the intensities of the two light beams reflected from sensor 301 that re-enter fiber lead 131 be approximately equal. Light from sensor 301 is returned via fiber 131 through junction 129 and fiber 307 to entrance junction 147a of compensating interferometer 145, which comprises short optical path $L_1$, 149, and long optical path, $L_2$, that includes fiber 151a which incorporates phase modulator 153, and continues as fiber 151b to junction 147b to combine with short path 149.

The optical path difference between $L_2$ and $L_1$ equals the delay within the sensor 301, between light beams reflected from junction 303 and reflector 305. Therefore, the light reflecting junction 147b includes a highly coherent superposition of reflections from junction 303 and reflector 305. Since compensating interferometer 145 is isolated from sound, vibration and other sources of phase modulation, the modulation attributable to the interference of beams that are now combined in fiber lead 159 from junction 146b will be attributable to modulation by fiber sensor 301. Low frequency, out-of-band relative phase modulation between the two beams can be removed by signal processing that is well understood for conventional two beam optical fiber interferometric sensors. The long path that includes fiber 151a and fiber 151b, also includes phase modulator 153, which may be a piezoelectric cylinder upon which is wrapped fiber 151a, the extension of which is fiber 151b.

Alternatively, a fixed frequency shift rather than phase modulation could be implemented in the long path of the compensating interferometer. Light from fiber lead 159 is incident on light detector 169. Photocurrent 171 is amplified by amplifier 173, which responds to frequencies from D.C. throughout the acoustic signal band, and also to frequency f, from frequency generator 157, and to the harmonic 2f of that frequency, and to sidebands of these frequencies imposed by phase modulation of light by the sensor. Oscillator 157 outputs reference signals 309, proportional to sin $\omega_r t$, and 311, proportional to cos $2\omega_r t$ to demodulation filter 313. Oscillator 157 also outputs signal 155 proportional to sin $\omega_r t$ to drive phase modulator 153. Demodulation filter 313 yields in-band output 315. Alternatively, feedback means rather than heterodyne means could be used to maintain constant phase (quadraphase condition) in the interferometer to facilitate signal measurement.

Figure 4:
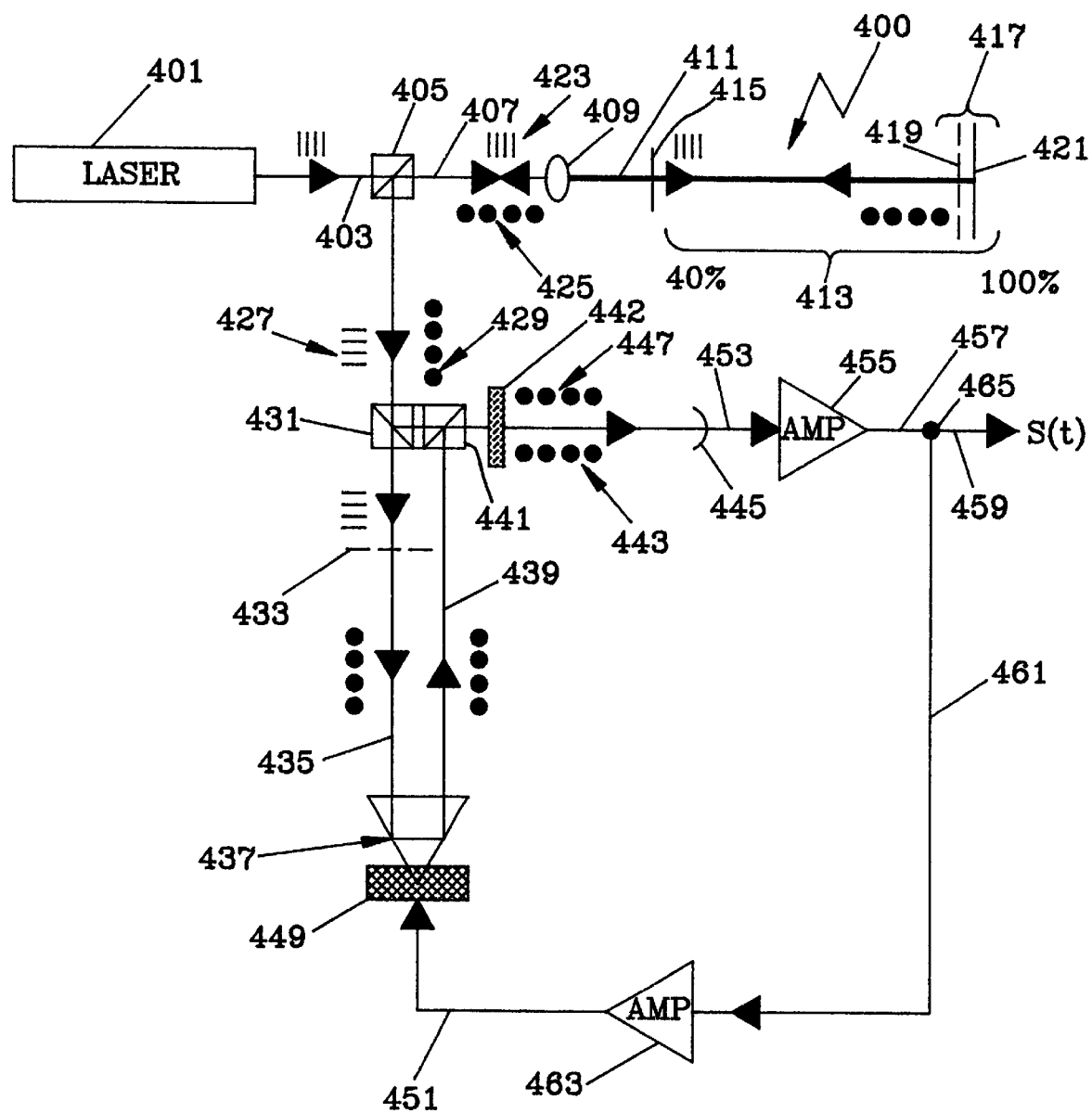
FIG. 4 shows a technique for demodulation of a single phase sensor using polarized light.

FIG. 4 shows the operation of a remote passive phase sensor wherein polarization maintaining fibers and junctions, and polarization selective beam splitters are used to enhance overall optical efficiency. The cores of the single mode fibers needed for operation of the remote phase sensors described herein are circularly symmetric, so that the wavenumber characterizing propagation of light in the fibers is independent of the polarization of linearly polarized light infiltered to the fiber. Polarization is maintained over several kilometers in the best contemporary single mode fibers. Laser 401 generates light beam 403, which is polarized in the plane of incidence of beam splitter 405. The plane of polarization of laser beam 403 is shown to be in the plane of the diagram, as indicated by four short lines. Light beam 407 from beam splitter 405 is projected by lens 409 into fiber lead 411. Fiber lead 411 transmits the plane polarized light to phase sensor 413. Phase sensor 413 is joined to fiber lead 411 by butt-junction 415, which is partially reflecting e.g. 40%. Sensor 413 is terminated by polarization rotating reflector 417, which comprises quarter-wave plate 419, bonded to mirror 421 which is a full reflector. In the two passes through quarter-wave plate 419, the polarization of the light is rotated through 90°, so that the reflected light is polarized perpendicular to the initial plane of incidence as shown by four dots. The reflectance of junction 415 is such that the two originally polarized light beams that re-enter fiber lead 411 from sensor 413 are off approximately equal intensity but of perpendicular polarizations. The polarized beams from fiber lead 411 are expanded by lens 409 and as light beams in the plane, 423, and perpendicular to the plane, 425, and are reflected by beam splitter 405 to become beams 427 and 429 respectively. Beam 427, in the plane, passes unchanged through polarizing beamsplitter 431, then through half-wave plate 433, to become beam 435, polarized perpendicular to the plane. Beam 435 is reflected back from 90° prism (retro-reflector) 437 as beam 439, which is deflected at beam splitter 441, and as beam 443 is incident on light detector 445. Beam 429, perpendicular to the plane, is deflected by polarizing beams plitter 431, and as beam 447 is combined by beam splitter 441 with beam 443. Once beams 443 and 447 have the same polarization and have propagated through equal paths from the light source they are mutually coherent. The temporal coherence on the light source is not a critical factor in the specific technique shown in FIG. 4. The light source may be temporally coherent.

As in the previous embodiments, the optical path comprising light beams 431 and 439 compensates for the path difference introduced in the remote phase sensor. Since the beams 443 and 447 are virtually coherent, their combining in within sensor 413. Retro-reflector 437 is bonded to piezolectric disc 449, which phase modulates the light beam 439 with a feedback signal 451. Photocurrent 453 from light detector 445 is amplified (D.C. through sensor signal band). Output 457 from amplifier 455 is divided at junction 465 into signals 459 and 461, which are identical. Signal 461 is amplified by low pass feedback amplifier 463, which passes a band from D.C. up to but not including, the sensor signal band, and outputs an inverted signal 451 which compensates for low frequency phase moduration in sensor 413 and maintains an overall quadrature condition. As a consequence, the signal output 459 is proportional to the in-band phase modulation within the remote sensor. It is assumed that the compensation paths 435 and 439 are isolated from in-band phase perturbation.

Figure 5:
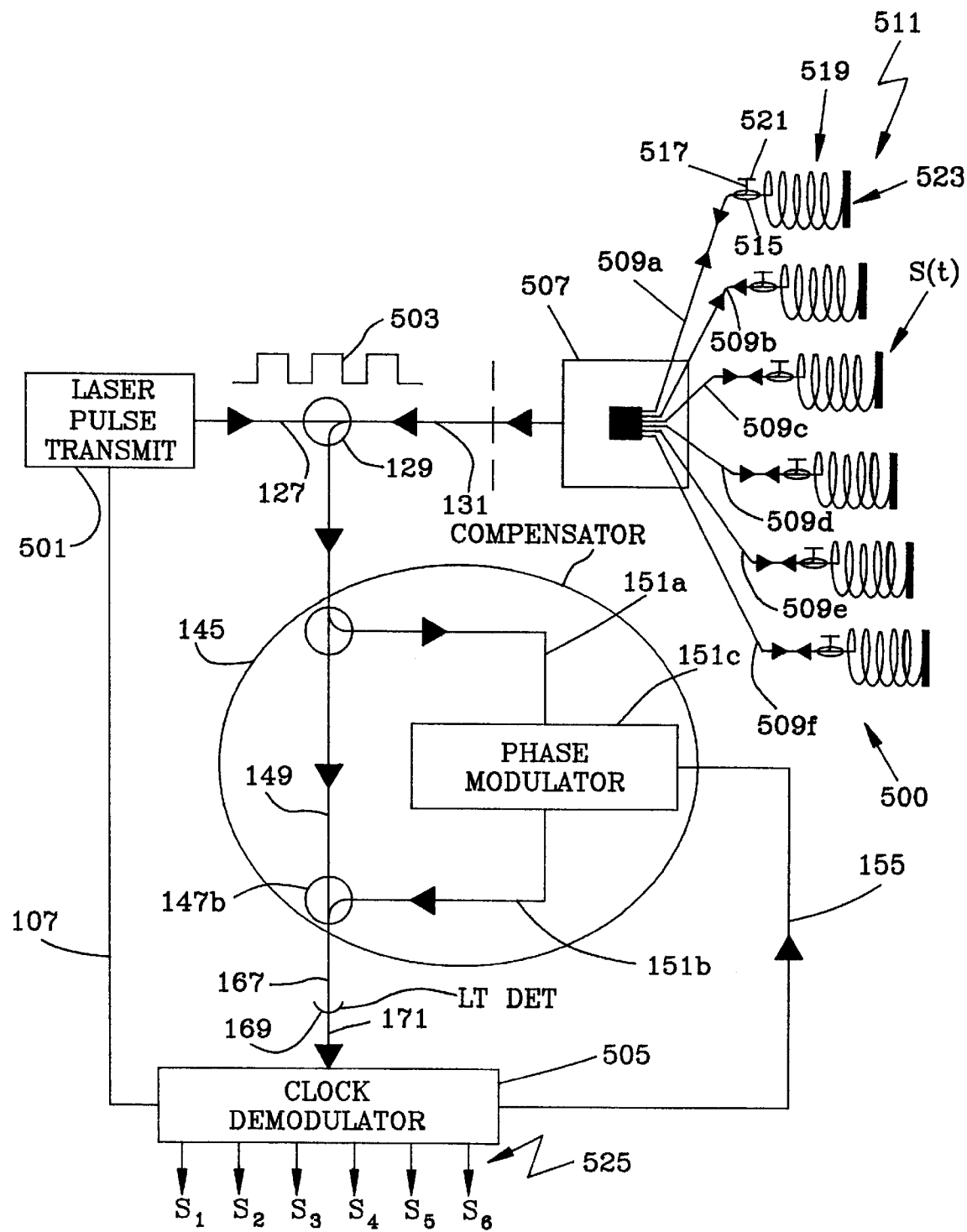
FIG. 5 shows an embodiment of the present invention where the outboard sensor array is arranged in a parallel configuration.

FIG. 5 shows an array 500 comprising remote phase type optical sensors that are deployed by means of parallel fiber leads. Signals from the discrete sensor leads are serially multiplexed via a passive junction into a single lead to activate optical and electronic components. With respect to light modulation and signal processing, operation of the parallel sensor array is closely analogous to that of the serial array of FIG. 1. Therefore the description that follows is somewhat condensed. Laser pulse transmit 501 generates a pulsed light beam 503, the timing of which is determined by trigger pulse 107 from clock-demodulator 505. Transmit 501 comprises laser 101, shutter 105, intensity modulator 117 and lens 125. Clock-demodulator 505 also performs several functions that were separately described in FIG. 1. Those functions include; current amplification, serial-to-parallel demultiplexing, signal integration-demodulation filtering, pulse generation, and reference frequency generation. Light beam 503 is transmitted by fiber 127 via 3 dB junction 129 and fiber lead 131 to junction 507, which distributes light equally to a plurality of fiber leads 509a–f, which in turn transmit the light to a parallel phase sensor array 511. For example, lead 509a to a first sensor 513a is the shortest of the 509 leads from junction 507, and is split at 3 dB junction 515 into short path 517 and fiber sensor path 519. It is noted that each sensor 509 may be replaced with a serial array 133 such as shown in FIGS. 1 and 2 resulting in a parallel arrangement of serial arrays. Short path 517 is an extension of lead 509a, and is of minimum practical length, e.g., a few centimeters. Fiber sensor 519 may be much longer, e.g., several meters, depending upon sensor needs.

The path difference between sensor path and short path is the same for all sensors of array 511. Short path 517 is terminated in full reflector 521; fiber sensor path 519 is terminated in full reflector 523. Alternatively, this Michelson type interferometer structure may be replaced by a Fabry-Perot configuration as in FIG. 1. In that case, a partially reflecting butt-junction will replace 3 dB junction 515. The Michelson configuration is efficient and eliminates multiple reflections. Proceeding from lead 509a, which is the shortest lead, fiber leads 509b–f from junction 507 increase sequentially in length by equal increments. The difference in length as between leads 509a and 509b exceeds the difference in length between sensor path 519a and short path 517a within sensor 513a. Each pulse within pulsed light beam 503 is short relative to the time delay between reflected pulses from reflector 523 and reflector 521, or equivalently the time delay between long path 151a–c and short path 149 of compensator 145. Therefore, for each pulse that is inputted to a sensor, three pulses are obtained in photocurrent 171 from light detector 169. These pulses are: the reflection from full reflector 521 that propagates via short path 517 to junction 147b; the superposition of reflections from reflector 521 and reflector 523 traveling respectively via path 151a, 151c, 151b and via path 149 to junction 147b; and the reflection from reflector 523 traveling via path 151a, 151c and 151b to junction 147b.

The superimposed reflections, which are mutually coherent, provide an intensity modulation attributable to interference of light in light beam 167 incident on light detector 169, which is the phase modulation attributable to sensor 519. Photocurrent 171 is operated upon by clock-demodulator 505, which also generates trigger pulses 107 and reference frequency 155 applied to phase modulator 151c, to yield as output the sensor signals 525. The increase in lead length between successive sensors is such that the third pulse received from a prior sensor is distinctly resolvable from the first pulse of the next sensor which has a longer lead. The first pulse received from each sensor may be used as an intensity reference for the second pulse, which comprises the superposition of reflection from both ends of the remote sensor.

Figure 6:
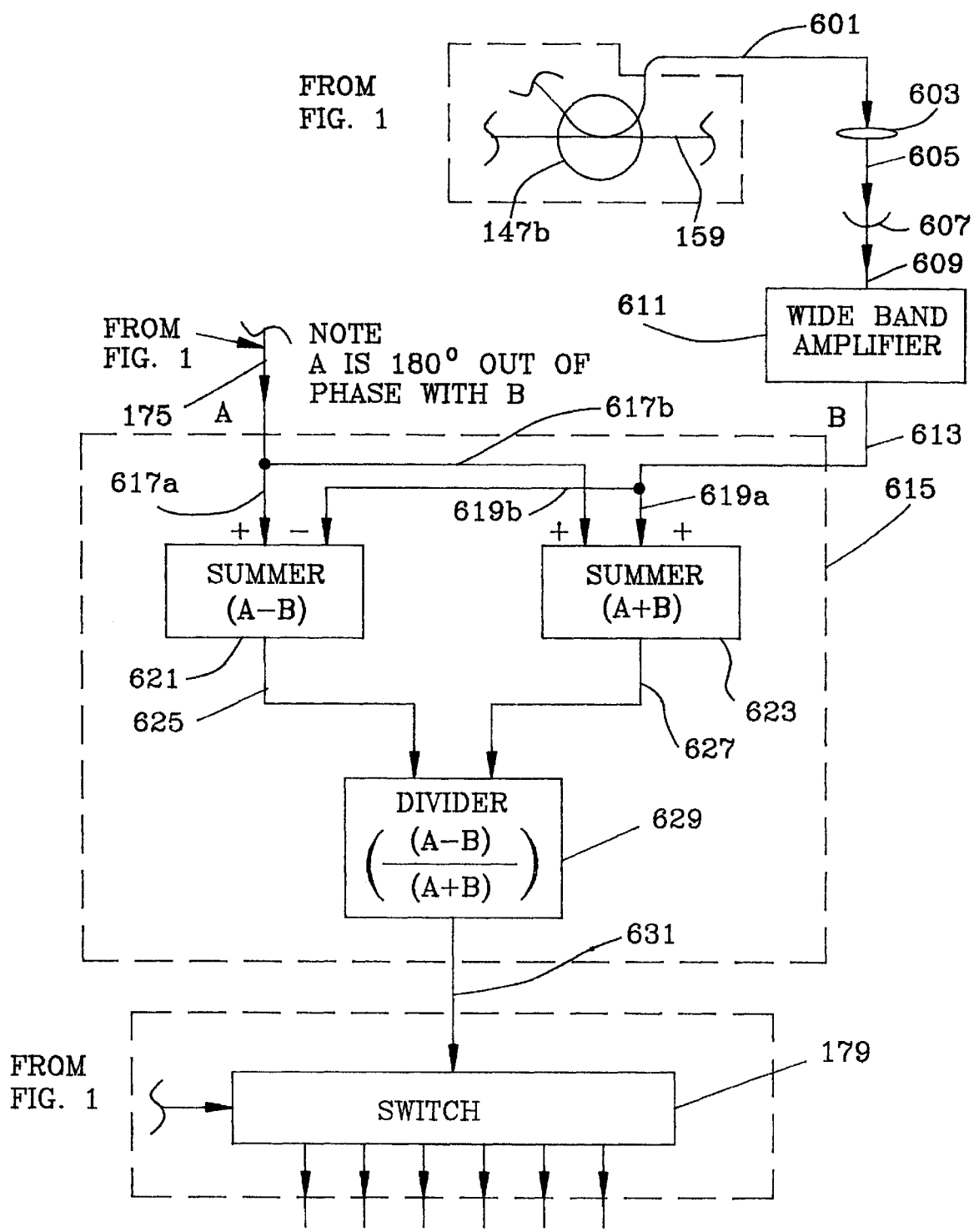
FIG. 6 shows an alternate processing technique for the system of FIG. 1.

FIG. 6 shows a known technique of cancelling the intensity noise on the part of the light source. One of the characteristics of the present invention over prior art is the ability to utilize such a technique as there are actually two fiber outputs of coupler 147b of FIG. 1 (only one of the outputs, 159, is shown in use as a specific) which have a unique relationship. Intensity normalizer 615 is inserted inline of signal 175 between amplifier 173 and processor 177 of FIG. 1. Combined light beams in exit junction 147b of FIG. 1 are transmitted into fibers 159 and 601 and projected by lenses 161 and 603 as beams 167 and 605 on to light detectors 169 and 607. The currents 171 and 609 from light detectors 169 and 607 are amplified by wideband amplifiers 173 and 611. The amplifier outputs 175 and 613 are inputted to intensity normalizer 615 and are each equally split by power splitter junctions 616 and 618 into 617a, 617b and 619a, 619b, respectively, as inputs to summers 621 and 623. Summer 621, with reference to the notation, actually performs the subtraction of 619b from 617a as output 625, whereas summer 623 performs the addition of 619a and 617b as output 627. Signal 625 is then divided by signal 627 by divider 629 as output 631 which is transmitted to switch 179 of processor 177 completing the inline substitution. It is noted that the function performed by divider 629 could be implemented at other locations within processor 177 or as a post processor 177 activity.

Advantages and new features of the present invention over the prior art is that it provides multiplexing of signals from an array of optical hydrophones upon one optical lead; discrete optical signals are derived by inboard signal processing; no outboard electricaly powered components are needed. The array of phase sensors requires no outboard reference paths. Inboard optical and electronic signal processing, utilized in conjunction with the serially accessed array, provides inherent freedom in the output from both phase and intensity noise for phase sensors, and from intensity noise in the case of microbend sensors.

In one embodiment we have an array of mechanically continuous phase sensors, that incorporate an optical reflection means for sampling phase at equal intervals along the array. Optical processing is performed by one inboard interferometer, which compensates the path difference, or equivalently, the time delay between successive reflections within the sensor array. The direct modulation of phase within a two beam interferometric hydrophone by periodic stretching of the reference fiber path, in an all parallel array configuration, would have required numerous outboard electrically powered devices. The novel elements of the phase sensor array are: (1) The serially accessed array of phase sensors, deployed remotely without reference paths. (2) The compensating interferometer to provide matching of time delays between beams successively reflected within the array. (3) The electronic processor including serial-to-parallel signal transfer, signal integration, feedback intensity stabilization, and demodulation and filtering of parallel channels to provide stable discrete hydrophone signals as output. (4) The combination of the above elements.

In an alternate embodiment we have an array of intensity modulating optical hydrophones in which the mechanism of light modulation is microbending of singlemode fiber. The array incorporates an optical reflection means for sampling intensity. An all parallel configuration composed of sensors that modulate transmission of light would require numerous outboard fiber leads, rather than one lead, and would be subject to intensity noise caused by mechanical perturbation of the leads. The novel elements of the intensity sensor array are: (1) The serially accessed array of single mode fiber hydrophones, in which the mechanism of light intensity modulation is microbending loss. (2) The electronic processor which incorporates serial-to-parallel signal transfer, signal integration, and ratiometer to provide signals as output. (3) The combination of the above elements.

What has thus been described is an optical waveguide hydrophone array, accessed remotely by a single mode fiber which transmits a light pulse sequence to the array and receives sound modulated return light signals. Within each hydrophone, butt coupled fibers form a continuous joint, encapsulated within a compressible plastic tube for mechanical stability. Tube volume expands and contracts linearly with variations in acoustic pressure thereby proportionally modulating the optical path therethrough. Each joint reflects part of the incident light beam back via the fiber lead to an interferometer which compensates for path differences between equally spaced array joints; then the beam passes through a light detector and a signal processor. Interference is produced between reflected light beams from successive joints pairs, from which phase modulation due to each hydrophone may be obtained. The partially reflecting joints thus permit serial sampling of the phase modulation of light as a function of position. Light reflected from the fiber lead/array joint provides a signal that is proportional to light source intensity variations and perturbation effects of the lead. This intensity noise therefore may be cancelled. Since the fiber lead provides a common conductor for phase modulated light beams from all joints, phase noise is not present. Also since path differences between interferring beams is matched precisely by a compensating interferometer, light source phase noise is cancelled.

Figure 7:
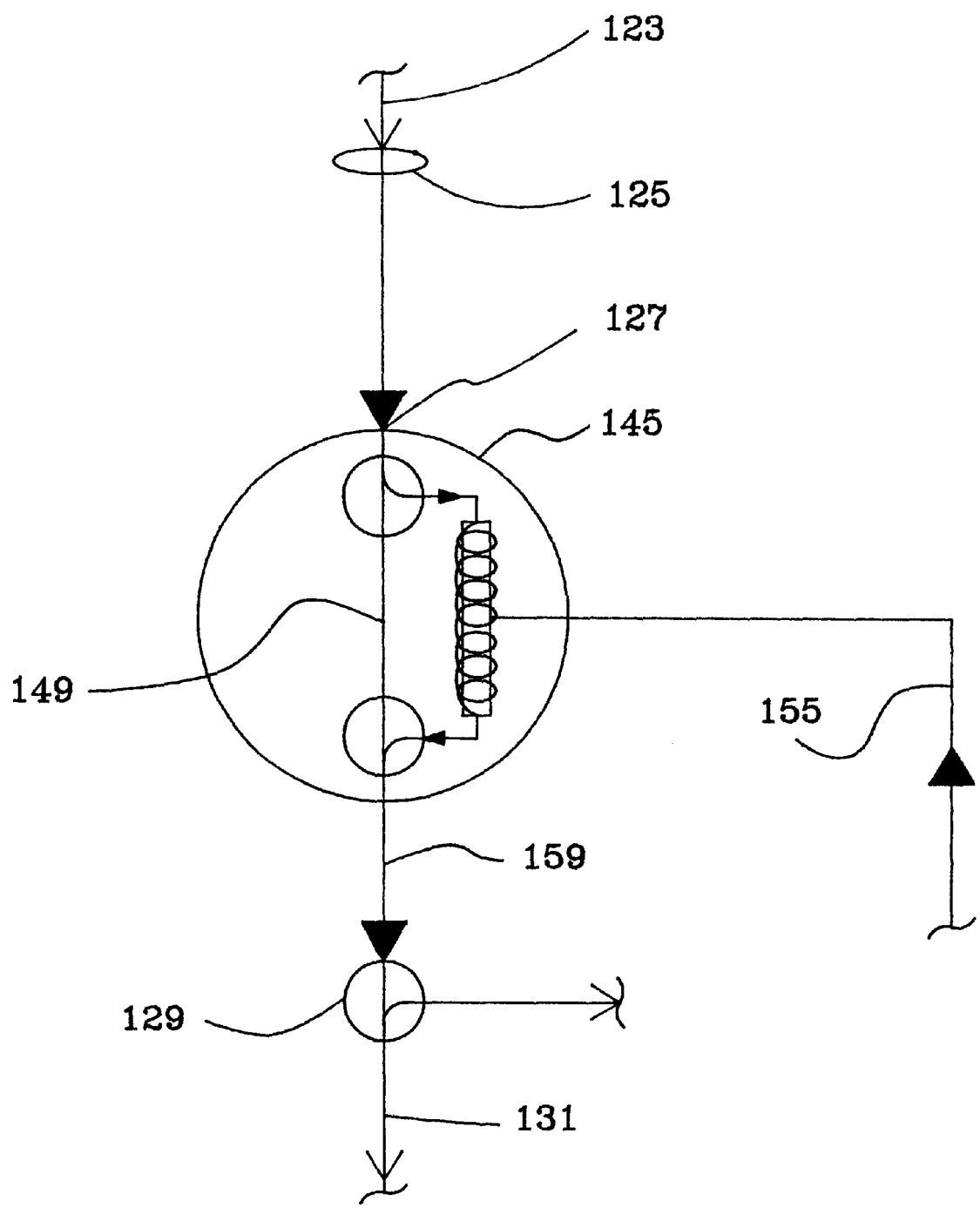
FIG. 7 is a modification of a fragment of the block diagram of FIG. 1 showing a variation of the present invention.

Obviously, many modifications and variations of the present invention may become apparent in the light of the above teachings. For example: as shown in FIG. 7 the compensating interferometer compensating interferometer could be located in the transmitter between lens 125 and coupler 129 of system 100 as a prehydrophone compensating interferometer 145'. The preferred location, within the receiver, provides signal processing advantage, especially the access to both outputs from the terminating fiber coupler as illustrated in FIG. 6. The number of hydrophones may be varied, and the type of reflecting joint may be selected based on desired array structure. In addition, where sensor detection thresholds are not critical, as in oil exploration, multimode fiber intensity type sensors may be used. Obviously, the integrated sensor telemetry technique herein disclosed may be applied to applications other than underwater acoustics; e.g., pressure sensors, magnetic field sensors, temperature sensors, with appropriate changes in the encapsulation of the fiber within the sensor.

In light of the above, it is therefore understood that within the scope of the appended claims, the invention may be practiced otherwise than as specifically described.

What is claimed is:

1. A hydrophone array system for sensing modulating perturbations occurring at a remote location, comprising:
   a light source including a laser, for producing a beam of coherent light;
   a pulse former, for receiving said light beam from said light source and producing therefrom a first signal train of coherent laser beam pulses as the output thereof;
   a prehydrophone compensating interferometer which produces mismatched beam paths for compensating acoustic hydrophones produced mismatches of beam paths, said compensating interferometer being optically coupled to the output of said pulse former and operative to transform each coherent laser beam pulse of said first signal train into a set of pulses consisting of a leading coherent laser beam pulse comprised of a portion of the intensity of said each pulse and a trailing coherent laser beam pulse comprised of another portion of the intensity of said each pulse, the forwardmost edge of the trailing pulse following the forwardmost edge of the leading pulse by a predetermined propagation delay time T, the sets of leading and trailing beam pulses resulting from the compensating interferometric operation forming a second forwardly propagating signal train comprised of a succession of said sets of leading and trailing coherent laser beam pulses, said prehydrophone interferometric compensator being isolated from said modulating perturbations;

a three-sided optical junction having a first side optically coupled to said prehydrophone compensating interferometer to receive said second signal train, and having second and third sides and being operative to couple said second signal train to its second side as an output therefrom;

at least two serially arrayed optical fiber hydrophones, positioned at a remote location at which they are subject to said modulating perturbations, said at least two optical fiber hydrophones being optically coupled to the second side of said optical junction, each optical fiber hydrophone of the at least two having an optical path therethrough formed of an optical fiber having a length L such that a pulse which unidirectionally traverses the length L of the optical fiber of the hydrophone is delayed by a propagation delay time substantially equal to ½ T, which length L of optical fiber is subject to variation in accordance with said modulating perturbations;

each hydrophone of said at least two serially arrayed optical fiber hydrophones having interposed in said optical path at the end of the fiber disposed toward the second side of said optical junction a first partial reflector of a successive pair of reflectors, and upon incidence against said first reflector of a set of leading and trailing beam pulses of the forwardly propagating second coherent laser beam signal train the first reflector causes the reflection back toward said second side of the optical junction of a first preselected portion of the intensity of said incident set of pulses, while the remainder of the intensity of the incident set is transmitted therethrough;

said predetermined relationship between the magnitude of duration of the leading and of the trailing pulses of said second signal train being so chosen to cause reflections of pulses respectively from the first and second reflectors of a successive pair to be temporally distinct pulses;

the reflected first preselected portions of the intensites of incident sets of leading and trailing beam pulses of said second signal train in their incidence against the first reflectors present in the at least two linearly arrayed optical fiber hydrophones, forming a third hydrophones-reflected coherent laser beam signal train comprised of a succession of sets of the first preselected portions of the intensities of the leading and trailing pulses;

each optical fiber hydrophone of the at least two, further having interposed in said optical path at the end of its fiber disposed away from said second output of the optical junction, the second reflector of said successive pair, said second reflector in the case of the optical fiber hydrophone which is next in position to the second side of said optical junction being partially reflective and said second reflector in the cases of other optical fiber hydrophones of the at least two being at least partially reflective, and upon incidence against a second reflector of said remainder of the intensities of a set of leading and trailing beam pulses originally incident against the first reflector, the second reflector causes the reflection back toward said second side of the optical junction of a second preselected portion of said remainder of the intensity, while any remainder of said remainder is transmitted therethrough;

the reflected second preselected portions of the intensities of incident sets of leading and trailing beam pulses of said forwardly propagating second coherent laser beam signal train against second reflectors present in the at least two linearly arrayed optical fiber hydrophones, forming a fourth hydrophones-reflected coherent laser beam signal train comprised of a succession of sets of at least portions of the remaining portions of the intensities of the leading and trailing pulses of the second signal train;

upon the mergeance of said third and fourth signal trains in their respective propagation to said second side of the optical junction, the trailing beam pulses of the succession of sets of leading and trailing beams pulses of the third signal train and the leading beam pulses of the succession of sets of leading and trailing beam pulses of the fourth signal train undergoing superpositionment and interference as the result of the mismatches of beam paths produced by reflections from the first and second reflectors of each optical hydrophone being compensated by the mismatch of beam paths produced by the prehydrophone compensating interferometer, to form an a fifth optical intensity signal train which is representative of the modulating perturbations experienced by the respective individual hydrophones of said at least two serially arrayed optical fiber hydrophones; and said three-sided optical junction being operative to couple the fifth signal train to its third side as an output thereof.

2. A hydrophone array system in accordance with claim 1 further including:

a modulator and an associated oscillator for driving same, said oscillator generating a first periodic reference signal of a predetermined frequency, $\omega r$, said modulator being operative to controllably modulate optical signals in the course of their propagation toward a light detector, including modulation of said fifth signal train in accordance with said first reference signal to generate products of modulation resulting from said modulation of the fifth signal train, said products of modulation including sideband signals to the frequencies $\omega r$ and $2\omega r$, said sideband signals being representative of the modulating perturbations experienced by the respective individual hydrophones of said at least two serially arrayed optical fiber hydrophones, said oscillator further generating second and third reference signals sin $\omega r$ and cos $2\omega r$, respectively;

a light-signal-to-electrical-signal detection stage including at least one light detector, said detection stage being optically coupled to the third side of said junction and operative to produce a light detector output signal comprising the portion of said products of the modulation of the fifth signal train which are present within a band of the electromagnetic wave energy spectrum including said sideband signals to the frequencies $\omega r$ and $2\omega r$;

a sideband signals demodulation processor including an output stage filter, said processor having a first input connected to the output of said light-signal-to-electrical-signal detection stage, for receiving said light detector electrical output signal, said signal processor further having second and third inputs for receiving said second and third reference signals, respectively, from said oscillator, the second and third reference signals being respectively coupled to the processor's second and third inputs via second and third coupling connections which are isolated from the sideband signal demodulation processors reception of said light detector electrical output signal;

said sideband signals demodulation processor being responsive to its reception of said light detector electrical output and the second reference signals to produce a first pre-final stage electrical output signal which is representative of the sine function of the modulating perturbations experienced by the successive hydrophones of said at least two serially arrayed optical fiber hydrophones;

said sideband signals demodulation processor being responsive to its reception of said light detector electrical output and the third reference signals to produce a second pre-final stage electrical output signal which is representative of the cosine function of the modulating perturbations experienced by the successive hydrophones of said at least two serially arrayed optical fiber hydrophones; and said output stage filter of said sideband signals demodulation processor receiving said first and second pre-final stage electrical output signals and producing therefrom a hydrophone array system electrical output signal which is representative of said succession of modulating perturbations experienced by the respective individual hydrophones of the at least two serially arrayed optical fiber hydrophones.

3. A hydrophone array system according to claim 1 wherein said optical fiber which forms the optical path through an optical fiber hydrophone is a single mode fiber.

4. A hydrophone array system according to claim 1 in which incidences of said portions of the intensities of a set of leading and trailing laser beam pulses of said second signal train against the pairs of reflectors respectively present in each optical fiber hydrophone of said at least two serially arrayed optical fiber hydrophones produce said fifth signal train, which is a serial sampling of said modulating perturbations as a function of the linear positions of the individual hydrophones in the at least two serially arrayed hydrophones.

5. A hydrophone array system according to claim 1 in which:

said prehydrophone compensating interferometric divides the intensity of each laser beam pulse of the first signal train into a pair of one and another laser beam pulse intensity portions and separates them for propagation along two optically parallel, respectively short and long, optical paths through the compensating interferometer;

the difference between the length of said short and long paths being so chosen to delay emergence of said another portion of the intensity of the laser beam pulse from the beam output end of the long path relative to the emergence of said one portion of the intensity of the laser beam pulse from the beam output end of the short path by said predetermined propagation delay time T; and said prehydrophone compensating interferometer merges the signals from the beam outflow ends of the short and long paths to propagate through a common optical beam output of said interferometric compensator, forming said second coherent laser beam signal train composed of a succession of sets of leading and trailing beam pulses.

6. A hydrophone array system according to claim 1 in which said three-sided optical junction is an optical fiber coupler and its first, second and third sides are first, second and third ports for coupling with fibers.

7. A hydrophone array system according to claim 1 in which the first preselected portions of the intensities of said second signal train of coherent laser beam pulses which are reflected by the first reflector of each hydrophone of said at least two serially arrayed optical fibers hydrophones, and the second preselected portions of the intensities of the remainder of the intensities of the forwardly propagating second signal train transmitted through the first reflector which are reflected by the second reflector of the same respective hydrophone are so chosen that the intensities of the portion of the trailing pulses of said third signal train which are reflected by the first reflector of a respective hydrophone and the intensities of the portion of the leading pulses of said fourth signal train reflected by the by the second reflector of the respective hydrophone are substantially equal.

8. A hydrophone array system according to claim 1 wherein:

said at least two optical fiber hydrophones comprise a first optical fiber hydrophone adjacent to said second side of said optical junction and a second optical fiber adjacent to downbeam side of the first optical fiber hydrophone; and said second reflector of said first optical fiber hydrophone and said first reflector of said second optical fiber hydrophone are one in the same.

9. A hydrophone array system according to claim 2 in which said modulator is a phase modulator.

10. A hydrophone array system according to claim 2 in which:

said prehydrophone compensating interferometer divides the intensity of each laser beam pulse of the first signal train into a pair of one and another laser beam pulses intensity portions and separates them for propagation along two optically parallel, respectively short and long, optical paths through the compensating interferometer;

the difference between the length of said short and long paths being so chosen to delay emergence of said another portion of the intensity of the laser beam pulse from the beam output end of the long path relative to the emergence of said one portion of the intensity of the laser beam pulse from the beam output end of the short path by said predetermined propagation delay time T;

said prehydrophone compensating interferometer merges the signals from the beam output ends of the short and long paths to propagate through a common optical beam output of said interferometric compensator, forming said second coherent laser beam signal train composed of a succession of sets of leading and trailing beam pulses;

said modulator comprises a piezoelectric element which undergoes size modulation in a predetermined dimension thereof under excitation by said first periodic reference signal; and one of one and the other of said short and long optical paths through the prehydrophone compensating interferometer comprises an optical fiber including a portion thereof wrapped around the piezoelectric element, the construction and arrangement being such that the length of fiber wrapped around the piezoelectric element modulates with the modulation of the piezoelectric element.

11. A hydrophone array system according to claim 2 in which the operation of the sideband signals demodulation processor in producing said first and second pre-final stage output signals, includes employment of hetrodyne-type demodulation techniques.

12. A hydrophone array system according to claim 1 in which said first coherent laser beam signal train of pulses is a signal train of periodic pulses having a duration equal to T.

13. A hydrophone array system according to claim 1 wherein said fifth optical signal train is produced by the superposition of reflected portions of the same pulse of the first signal train reflected from the first and second reflectors, respectively, of the pair of successive reflectors in an optical fiber hydrophone of said at least two serially arrayed hydrophones.

14. A hydrophone array system according to claim 1 in which each optical fiber hydrophone of said at least two serially arrayed hydrophones functions in the mode of a phase sensor.

15. A hydrophone array system according to claim 6 in which each length L of optical fiber of each hydrophone of said at least two serially arrayed optical fiber hydrophones is helical configured and maintained in mechanically fixed relation to a compressible tubular structure whose volume varies with variations in acoustic pressure, the construction and arrangement of the fiber and the tubular structure further providing mechanical stability to the reflectors of the hydrophone.

16. A hydrophone array system in accordance with claim 15 wherein the tubular structure is made of a compressible plastic and the helically configured fiber of the hydrophone is encapsulated therein.

* * * * *